(12) United States Patent
Wilkins et al.

(10) Patent No.: US 11,619,407 B2
(45) Date of Patent: Apr. 4, 2023

(54) SYSTEM AND METHOD FOR EQUIPMENT MANAGEMENT AND SERVICE

(71) Applicant: Motili, Inc., Denver, CO (US)

(72) Inventors: Jeff Wilkins, Boulder, CO (US); Ian Wilkins, Boulder, CO (US); James Bowman, Denver, CO (US)

(73) Assignee: Motili, Inc., Denver, CO (US)

( * ) Notice: Subject to any disclaimer, the term of this patent is extended or adjusted under 35 U.S.C. 154(b) by 0 days.

(21) Appl. No.: 16/288,132

(22) Filed: Feb. 28, 2019

(65) Prior Publication Data

US 2019/0271479 A1 Sep. 5, 2019

Related U.S. Application Data

(60) Provisional application No. 62/637,379, filed on Mar. 1, 2018.

(51) Int. Cl.
| | |
|---|---|
| *F24F 11/30* | (2018.01) |
| *G05B 15/02* | (2006.01) |
| *G06K 9/46* | (2006.01) |
| *G06V 10/40* | (2022.01) |
| *G06V 30/10* | (2022.01) |

(52) U.S. Cl.
CPC .............. *F24F 11/30* (2018.01); *G05B 15/02* (2013.01); *G06V 10/40* (2022.01); *G06V 30/10* (2022.01)

(58) Field of Classification Search
CPC ....... F24F 11/30; G06K 9/46; G06K 2209/01; G06K 9/00449; G05B 15/02
See application file for complete search history.

(56) References Cited

U.S. PATENT DOCUMENTS

| | | | | |
|---|---|---|---|---|
| 9,841,358 | B2 * | 12/2017 | Amirpour | G01M 17/007 |
| 2010/0261465 | A1 * | 10/2010 | Rhoads | H04M 1/72415 |
| | | | | 455/420 |
| 2011/0290882 | A1 * | 12/2011 | Gu | G06K 7/1456 |
| | | | | 235/462.11 |
| 2012/0134588 | A1 * | 5/2012 | Zhang | G06K 9/3275 |
| | | | | 382/176 |
| 2013/0136310 | A1 * | 5/2013 | Hofman | G06V 10/751 |
| | | | | 382/104 |
| 2013/0294653 | A1 * | 11/2013 | Burry | G06V 20/63 |
| | | | | 382/105 |
| 2014/0061293 | A1 * | 3/2014 | Jayaprakash | G06F 21/602 |
| | | | | 235/375 |
| 2014/0329461 | A1 * | 11/2014 | Ramachandran | H04B 5/0031 |
| | | | | 455/41.1 |
| 2015/0229360 | A1 * | 8/2015 | Ramachandran | H04L 67/306 |
| | | | | 455/420 |
| 2015/0242642 | A1 * | 8/2015 | Jayaprakash | G06F 21/602 |
| | | | | 380/246 |
| 2015/0278381 | A1 * | 10/2015 | Leeds | G06F 16/9554 |
| | | | | 235/375 |
| 2015/0292985 | A1 * | 10/2015 | Yenni | G05B 23/0221 |
| | | | | 702/182 |
| 2015/0327084 | A1 * | 11/2015 | Ramachandran | H04B 5/0031 |
| | | | | 455/418 |

(Continued)

*Primary Examiner* — Charles R Kasenge
(74) *Attorney, Agent, or Firm* — K&L Gates LLP (57) ABSTRACT

A method for processing information regarding a climate-control device is provided. The method includes the steps of generating a virtual asset tag of the climate-control device; processing the virtual asset tag; and extracting information about the climate-control device from the virtual asset tag.

13 Claims, 6 Drawing Sheets

(56) References Cited

U.S. PATENT DOCUMENTS

| | | | | |
|---|---|---|---|---|
| 2015/0330646 A1* | 11/2015 | Matsumoto | ............ | G05B 15/02 |
| | | | | 700/276 |
| 2016/0086045 A1* | 3/2016 | Roberts | ................... | F24F 11/62 |
| | | | | 382/183 |
| 2016/0146866 A1* | 5/2016 | Houlette | .............. | G01R 21/133 |
| | | | | 702/62 |
| 2016/0147243 A1* | 5/2016 | Micali | ................. | G06F 16/9024 |
| | | | | 700/295 |
| 2016/0148099 A1* | 5/2016 | Micali | ..................... | G06N 5/04 |
| | | | | 706/11 |
| 2016/0328651 A1* | 11/2016 | Micali | ................... | G06N 20/00 |
| 2017/0026606 A1* | 1/2017 | Kim | .................. | H04N 21/4108 |
| 2017/0142249 A1* | 5/2017 | Shinar | ................... | H04L 12/282 |
| 2017/0192042 A1* | 7/2017 | Micali | .................. | G05B 15/02 |
| 2017/0307239 A1* | 10/2017 | Wallace | ................... | F25D 29/00 |
| 2017/0307246 A1* | 10/2017 | Ohara | ..................... | F24F 11/58 |
| 2017/0350616 A1* | 12/2017 | Yenni | ...................... | G05B 23/0216 |
| 2017/0364106 A1* | 12/2017 | Smith | ..................... | F24F 11/62 |
| 2018/0023837 A1* | 1/2018 | Kraft | .................. | H04L 41/0846 |
| | | | | 700/276 |
| 2018/0270440 A1* | 9/2018 | Kim | ................ | H04N 21/42207 |
| 2018/0283716 A1* | 10/2018 | Ribbich | ................... | F24F 11/49 |
| 2020/0041154 A1* | 2/2020 | Ribbich | ................... | F24F 11/30 |

* cited by examiner

SYSTEM AND METHOD FOR EQUIPMENT MANAGEMENT AND SERVICE

CROSS-REFERENCE TO RELATED APPLICATIONS

This application claims priority to and benefit of U.S. Provisional Patent Application No. 62/637,379, entitled "System and Method for Equipment Management and Service," filed on Mar. 1, 2018, and which is herein incorporated by reference in its entirety.

BACKGROUND

This section is intended to introduce the reader to various aspects of the art that may be related to various aspects of the presently described embodiments. Accordingly, it should be understood that these statements are to be read in this light, and not as admissions of prior art.

Modern consumers expect residential and commercial structures to be climate controlled. To that end, owners and occupants employ a myriad of devices that provide conditioned air and water, for example. Heating, ventilation, and air-conditioning ("HVAC") systems circulate indoor air over low-temperature (for cooling) or high-temperature (for heating) sources, thereby adjusting the indoor space's ambient air temperature. Refrigeration devices cool a confined space, often to keep perishables fresh. And water-conditioning equipment—like hot-water heaters or water coolers—are used to provide heated or cooled water that occupants may use for any number of purposes.

These climate-conditioning devices often require maintenance or repair. Unfortunately, the servicing technician typically lacks detailed information about the device he or she is about to diagnose. Moreover, the owners or occupants of various structures generally don't have compiled knowledge about any of the climate-control devices used in the structure—especially if they are not the first owner or occupant. This too poses problems. For example, the owner of a large residential complex may wish to inventory the type and age of climate-control devices installed at the complex, to determine if an upgrade is warranted or economically justified.

Traditional methods of collecting data can be labor-intensive and error-prone, and often leads to silo-ization of valuable information. For example, service technicians may manually inventory climate-control devices by looking at an equipment plate—which may include information about the device, like manufacture date, serial number, and other characteristics and specifications—affixed to the device. First, as a manual process, a technician's entry of long alphamerical strings of information taken from the plate is subject to error. Second, the technician may change between service calls for a given device, or different technicians may be called for repairing different types or different aspects of the climate-control devices. This prevents the centralization of data—hindering the transformation of information into knowledge. Third, information manually collected by the technician may not be communicated to the apartment complex's owner, for example, who could benefit from an inventory of the climate-controlled devices installed at the property. A subsequent property owner could also benefit from that information.

In certain instances, limited automation has been employed in various industries to gather device data. For example, some devices carry a matrix barcode—such as a QR Code® barcode available from Denso Wave Corporation in Japan—that contains basic information about the device. Other devices may carry a radio-frequency identification (RFID) tag that contains relevant device information. But if the matrix barcode or RFID tag is not installed at the time of manufacture, associating information about the device is still a manual process. The technician must affix the RFID or barcode tag to the newly tagged device. Then, he or she manually inputs that tagged device's information into a database to correlate the tagged device's information to the now-affixed barcode or RFID tag. Manual entry of long model codes or serial numbers on a laptop or mobile device by a technician—who is likely focused on repair and not data entry—is prone to error.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to asset-tagging systems and methods for climate-control devices, such as an air conditioner. A technician creates a virtual asset tag by, for example, taking an image of the air conditioner and its surrounding environment. That image is processed to facilitate the extraction of pertinent information about the device's characteristics. Moreover, in certain embodiments, the image may be pre-processed, modified and sent to human processors who can more efficiently review and extract information from the processed image than if they had done the same with the unprocessed image. In yet other embodiments, the extracted information and processed image can be used to verify the accuracy of the human processors.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Figure 1:
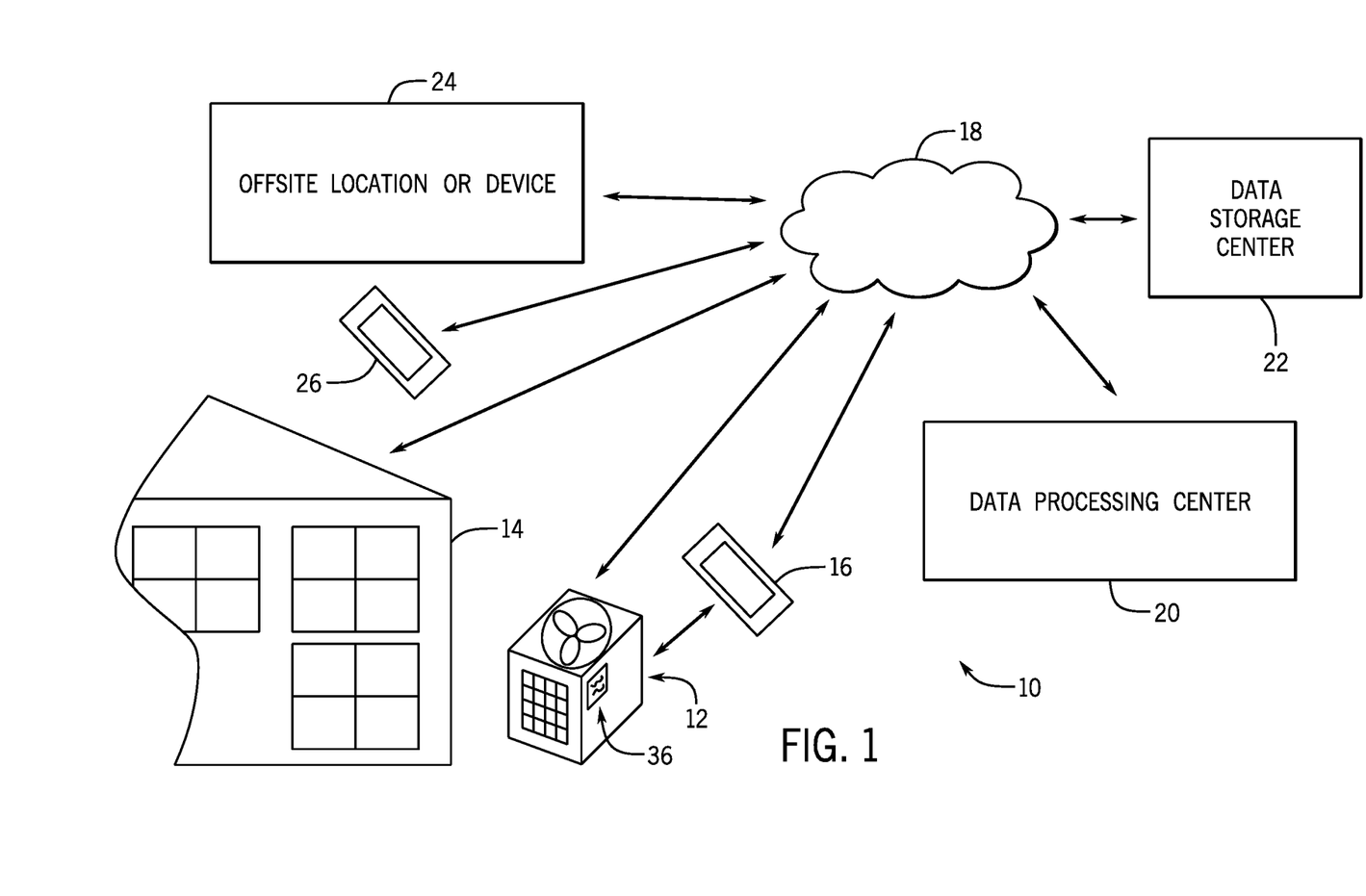
FIG. 1 illustrates schematically a communication system for retrieving, processing, extracting and transmitting or information about a climate-control device, in accordance with an embodiment of the present disclosure.

Turning now the figures, FIG. 1 illustrates a communication system 10 for transmitting, receiving, processing, and extracting information about a climate-control device 12, in accordance with one embodiment. As illustrated, the climate-control device 12 is the outdoor unit of an air-conditioner (AC) that provides conditioned air to a structure 14. However, it is envisaged that the methods and systems described herein are applicable to a host of other devices, including other climate-control devices like indoor AC units, water heaters, duct works, furnaces, heat pumps, air handlers, indoor-air quality devices, filtration systems, and refrigeration devices, to name but a few.

From time to time, the AC unit 12 may require servicing or repair. Or a property owner may be installing the equipment for the first time. Whatever the case, a technician can create a virtual asset tag of the device 12 by capturing an image of the device 12 and surrounding area using an imaging device 16—e.g., a digital camera, a film camera, a laptop, a handheld device, or a cellphone, to name a few. Advantageously, the virtual asset tag may include embedded metadata—like a geotag, date or time information, or user information—that can provide or be used to deduce characteristics of the imaged climate-control device 12.

The image could be processed locally on the device 16 or a local-area network (LAN), or it could be transmitted to a separate location for processing via a network 18. As one example, the network may be a "cloud" style network that connects computing nodes via wireless, Bluetooth®, cellular Wi-Fi, satellite communications, and/or wired connections—each of which can operate using various communication protocols. Indeed, the network 18 may facilitate communications via e-mail, MMS, the Internet, mobile and web-based apps, to name a few options.

The illustrated network 18 facilitates communication between different nodes. For example, the network 18 allows the device to transmit the virtual asset tag—which may be an image of the climate-control device 12—to an offsite data processing center 20, where that virtual asset tag may be analyzed to deduce or extract information about the device 12. Once processed, the virtual asset tag may be stored locally. Or it may be transmitted to a data storage center 22, which can act as a central repository that multiple users, who may be at an offsite location 24 or using an offsite device 26, can access using the network 18. Advantageously, the network 18 facilitates both inbound and outbound communications. That is, the network provides two-way communication, whereby the network can be used to provide or receive data or other information to the imaging device 16, the structure 14 or the climate-conditioning device 12, for example.

Figure 2:
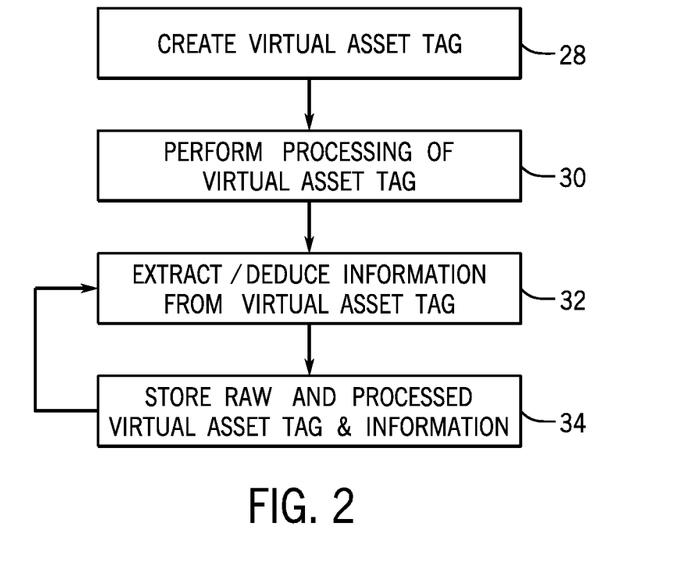
FIG. 2 is a flow chart for a method of creating and processing a virtual asset tag, in accordance with an embodiment of the present disclosure.

FIG. 2 illustrates at a high level an exemplary method in accordance with one embodiment. The technician creates a virtual asset tag by, for example, taking an image of the AC unit 12. (Step 28.) Using a processor—which, again, may be local or accessed through the network 18—that virtual asset tag may be processed to facilitate extraction or deduction of information about the device. (Step 30.) From there, information may be deduced or extracted from the processed virtual asset tag. (Step 32.) Advantageously, the virtual asset tag, both in the raw and processed forms, and the information deduced and extracted therefrom may be stored for future comparison with and reference for other virtual asset tags, which can improve the system's overall performance by, for example, providing a feedback loop or high-certainty data points that can be mined by artificial intelligence. (Step 34.)

Figure 3:
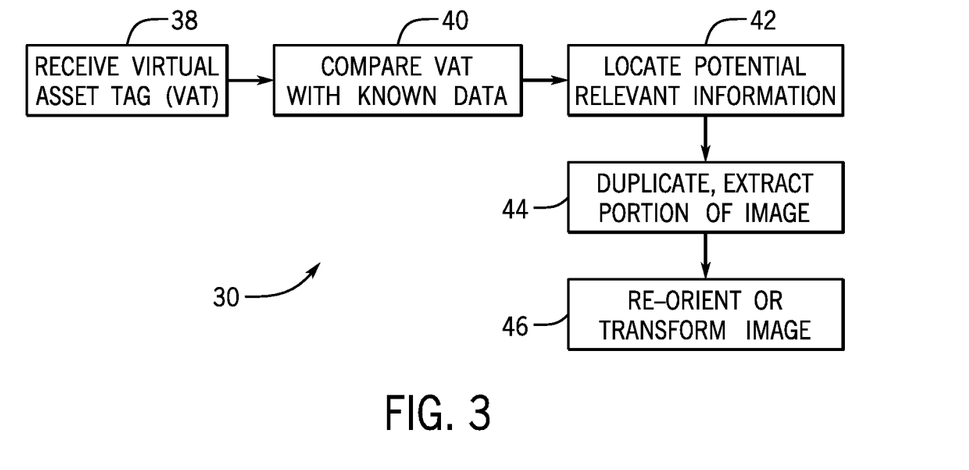
FIG. 3 is a flow chart for a method of processing a virtual asset tag, in accordance with an embodiment of the present disclosure.
Figure 4:
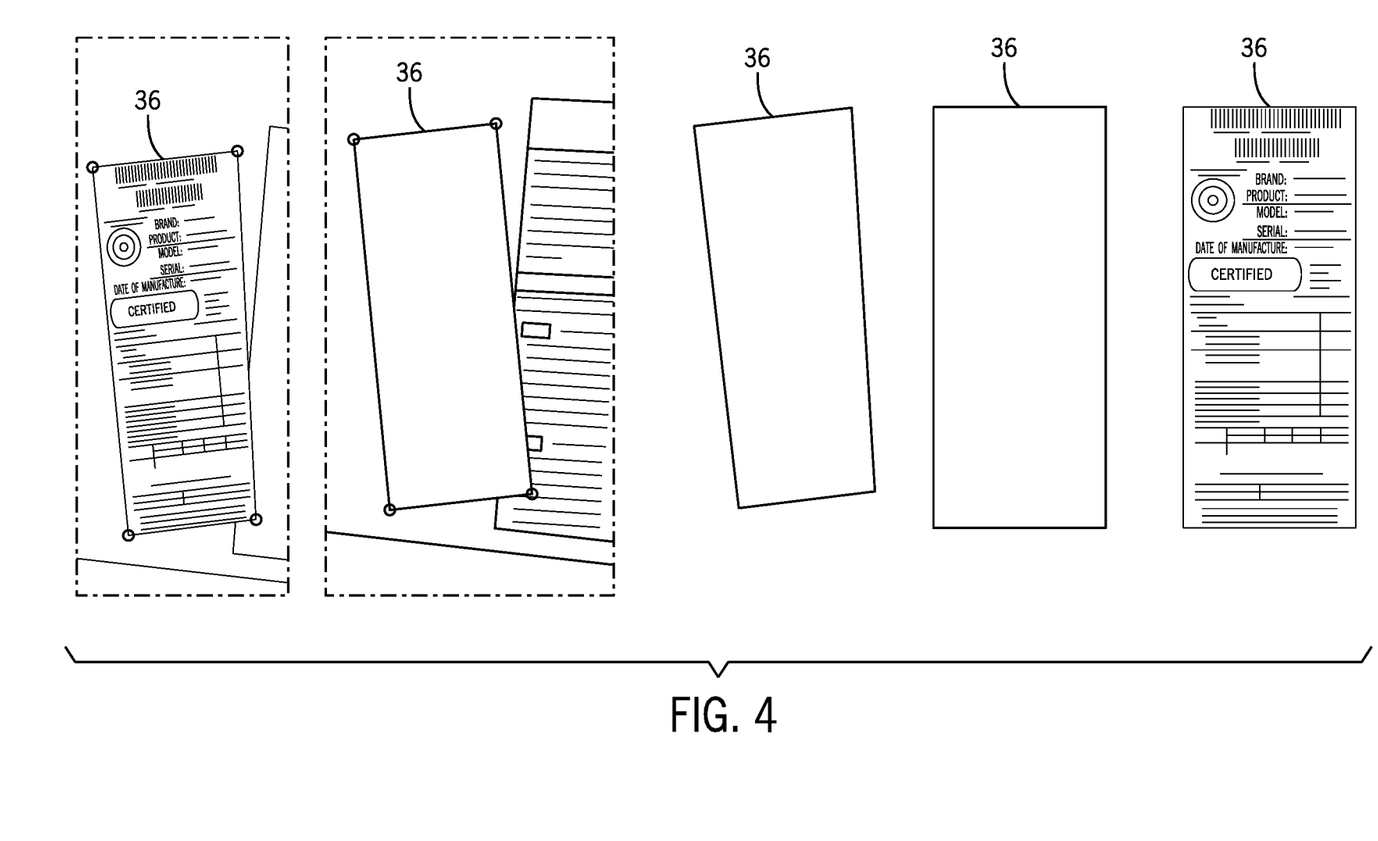
FIG. 4 illustrates schematically a method for processing a virtual asset tag, in accordance with an embodiment of the present disclosure.

FIGS. 3 and 4 illustrate steps in an exemplary processing method (step 30) for a virtual asset tag. In this example, the virtual asset is tag is an image of the climate-control device 12 and an equipment plate 36—which, as shown in FIG. 1, has manufacturer information and other characteristic about that climate-control device stamped or printed on it—affixed to the device 12. This image is received by the data processing center, whether local or at a networked, offsite location. (Step 38.) Whether the technician has manually or automatically embedded information about the climate-control device in the image or not, certain parameters about the device can be estimated with a high degree of confidence. That is, there are certain high-probability data points that the image can be compared to. (Step 40.)

For example, if the virtual asset tag includes embedded information about the location and/or time of or the technician taking the picture, that information can be correlated to information found in public databases of determine characteristics of the climate-control device. Time and location can be used to determine the size of the equipment by looking at shadows cast by the equipment. Moreover, the identity of the technician could yield information about the type of equipment being serviced, because it is unlikely a technician focusing on AC units would repair a water heater. The location information could be used to exclude certain types of equipment when comparing known data to the image; it is unlikely there would be a robust furnace in a home in Miami. An image of a door or an automobile—which is likely to be of a standard size—can be used to deduce information about the climate-control equipment.

As yet another example, nearly all climate-control equipment will include an equipment plate with text and a manufacturer's or certification logo. And that plate is almost certainly rectangular. Moreover, this plate will likely appear as a different color in the image when compared to the remainder of the equipment. Using that criteria, the image can be processed to determine the likely bounds of, for example, an equipment plate that has relevant information about the climate-control device's characteristics. (Step 42.)

However, once found, the raw image of the equipment plate 36 may be at an odd perspective, making the equipment plate difficult to read and interpret, whether done manually or with automated systems. (See leftmost image of FIG. 4.) Using automated techniques and the high-probability characteristics described above, the exemplary method includes the steps of duplicating the image and extracting a portion of it for transformation. (Step 44; see also second and third images from the left of FIG. 4.) Once extracted, the duplicated image can be reoriented or transformed to match a perspective more easily read and interpreted—again, whether using automated techniques or manually. (Step 46; see also rightmost image of FIG. 4.)

In one embodiment, low-pass filtering—such as Gaussian blurring—is employed to reduce the noise created by rough edges, debris, or image artifacts with respect to the equipment plate. The kernel size for the Gaussian blurring may be set as 5×5, and the standard deviation in the horizontal and vertical directions may be respectively calculated as follows:

$$\sigma x=0.3*((Duplicate\_Image\_Width-1)*0.5-1)+0.8$$

$$\sigma y=0.3*((Duplicate\_Image\_Height-1)*0.5-1)+0.8$$

Moreover, an approximate image gradient may be found using the Sobel and Scharr operators. As an example, assume that $G_x$ is the duplicated image with respect to the horizontal axis and $G_y$ is the same with respect to the vertical axis. Gradients may then be used to identify the location of the edges for the equipment plate. And, as an example, the following formulas may be used on each pixel when calculating edge gradients and gradient direction (calculated using gradient angle):

$$Edge_{Gradient(G)} = \sqrt{G_x^2 + G_y^2}$$

$$Angle\ (\phi) = \tan^{-1}\left(\frac{G_y}{G_x}\right)$$

If the Sobel and Scharr operators leave thick edges and edge regions that are not suitable for use as equipment plate contours, all points that are not local maxima can be removed, to reduce the edges to thin (ideally single pixel thick) lines For example, an edge or vertex should occur at the points where the edge gradient is greatest. Therefore, if a given pixel is not a local maxima, it is likely not an edge or vertex.

The edge mapping can be further refined by employing hysteresis thresholding to determine which of the remaining pixels are part of an edge and which are not. Any pixels with an edge gradient above a determined max-threshold are retained. Any pixels below a determined min-threshold are discarded. Pixels that fall between the min and max thresholds will be retained only if they are adjacent to a pixel that has been retained. A further assumption may be made during this step: Edges are long lines, and therefore, if only a small patch of pixels in a given region is retained, all of those pixels will be discarded.

It may be that the above-determined edges of the processed equipment-plate image do not form a complete rectangle or, in perspective, a quadrilateral. But the border of the equipment plate will likely suggest one. Thus, to determine the equipment plate, the automated process may select the largest complete or largest most-nearly complete quadrilateral, and discard all other edges.

Once the equipment plate is estimated with a high degree of confidence, a perspective transformation may be performed. In accordance with one embodiment, a 2D projective transformation or homography is performed. For example, the matrix for the contour of an equipment plate ("A") may take the following form, with the columns referring to the vectors that generate the top left, top right, bottom left, and bottom right corners of our contour, respectively:

$$A = \begin{bmatrix} a & b & c & d \\ e & f & g & h \end{bmatrix}$$

The width of the transformed image is the distance between the top left and top right point, or, the bottom left and bottom right point of the contour, whichever is greatest. This width will be reference as X. And the height of the transformed image is the distance between the top left and bottom left point, or, the top right and bottom right point of the contour, whichever is greatest. This width will be referenced as Y.

Thus, the matrix for the contour of our transformed image ("B") will have the following form, with columns referring to the vectors that generate the top left, top right, bottom left, and bottom right corners of the contour respectively.

$$B = \begin{bmatrix} 0 & X & X & 0 \\ 0 & 0 & Y & Y \end{bmatrix}$$

A and B are then homogenized into the following matrices.

$$A = \begin{bmatrix} a & b & c & d \\ e & f & g & h \\ 1 & 1 & 1 & 1 \end{bmatrix}$$

$$B = \begin{bmatrix} 0 & X & X & 0 \\ 0 & 0 & Y & Y \\ 1 & 1 & 1 & 1 \end{bmatrix}$$

In turn, the following systems are solved:

$$\begin{bmatrix} a & b & c \\ e & f & g \\ 1 & 1 & 1 \end{bmatrix} \begin{bmatrix} \alpha \\ \beta \\ \gamma \end{bmatrix} = \begin{bmatrix} d \\ h \\ 1 \end{bmatrix}$$

$$\begin{bmatrix} 0 & X & X \\ 0 & 0 & Y \\ 1 & 1 & 1 \end{bmatrix} \begin{bmatrix} \delta \\ \mu \\ \tau \end{bmatrix} = \begin{bmatrix} 0 \\ y \\ 1 \end{bmatrix}$$

Two new matrices will be formed from the solution to the above systems:

$$A' = \begin{bmatrix} a*\alpha & b*\beta & c*\gamma \\ e*\alpha & f*\beta & g*\gamma \\ \alpha & \beta & \gamma \end{bmatrix}$$

$$B' = \begin{bmatrix} 0 & X*\mu & X*\tau \\ 0 & 0 & Y*\tau \\ \delta & \mu & \tau \end{bmatrix}$$

And the matrix that will transform the original unprocessed extraction into the transformed perspective can be found by solving for C in the following system: $C=B'^{*}A'^{-1}$ Turing now to FIG. 5, this figure illustrate a process for extracting information from a virtual asset tag. For example, as is discussed above, the duplicate image of the equipment plate (i.e., the virtual asset tag) can be processed and transformed to make it easier to extract data therefrom. (Step 46.) That processed image can then be subject to optical character recognition or OCR. (Step 48.) If the OCR step leads to the determination that there is not sufficient text on the image (step 50) and the image has been rotated fewer than 3 times (step 52), the image is rotated 90 degrees (step 54), because the equipment plate is assumed to be rectangular, and run through OCR again (step 48). If after three rotations, sufficient text is not located, the image is flagged as "bad" or in need of human intervention and stored as such. (Step 56).

Figure 5:
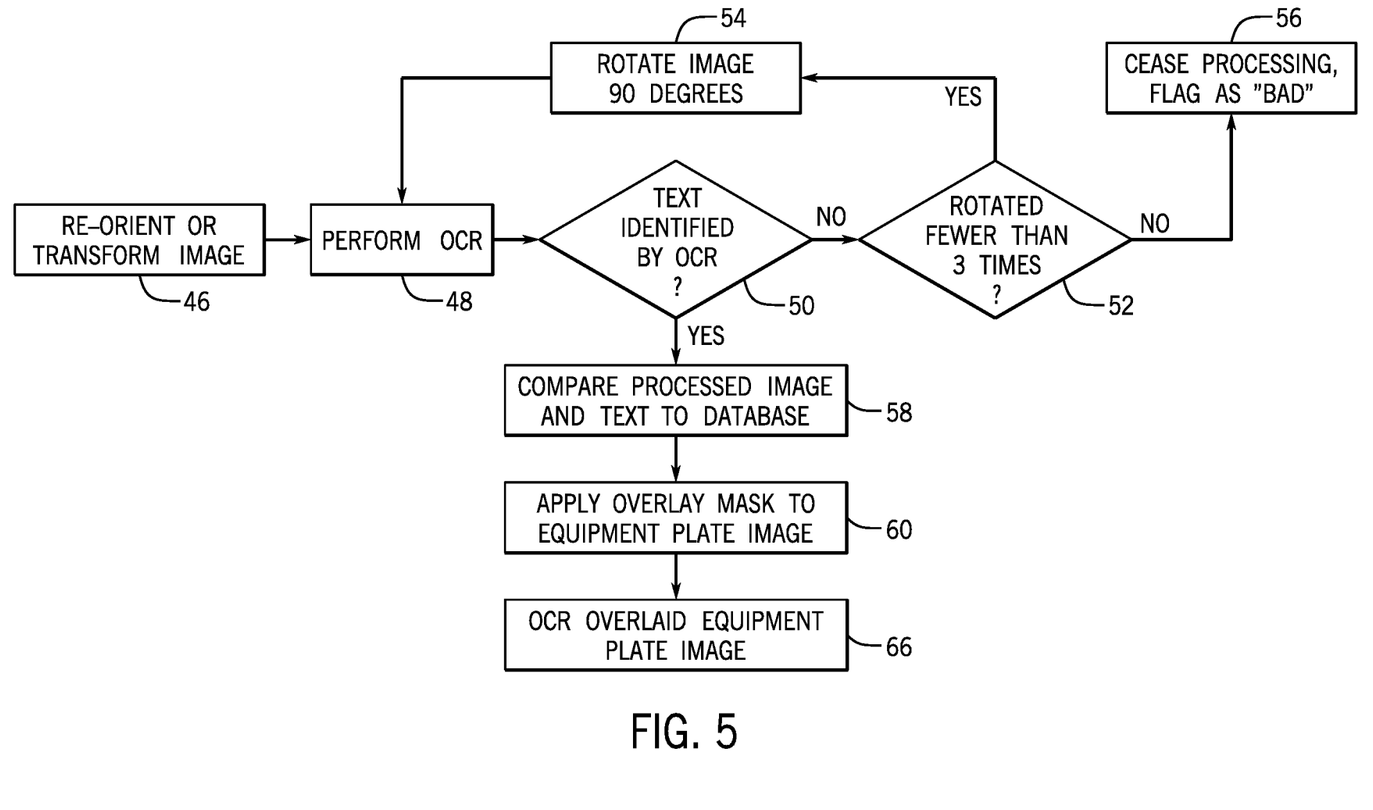
FIG. 5 is a flow chart for a method of processing and extracting information from a virtual asset tag, in accordance with an embodiment of the present disclosure.

However, if sufficient text is found via the OCR process, it can be deduced that the image is in the correct orientation. At that point, the exemplary method includes step 58, in which the processed image is compared to known images in a database. Advantageously, by estimating the location of the text or the size of the equipment plate, for example, a template mask can be selected from the database to overlay the processed image—to ensure that only desired information is fully subjected to OCR. (Step 58.) Indeed, the overlay may be selected by searching the equipment plate for the logo of or text associated with the manufacturer—with each manufacturer likely having a specific size or convention for providing its equipment's characteristics on the equipment plate.

Figure 6:
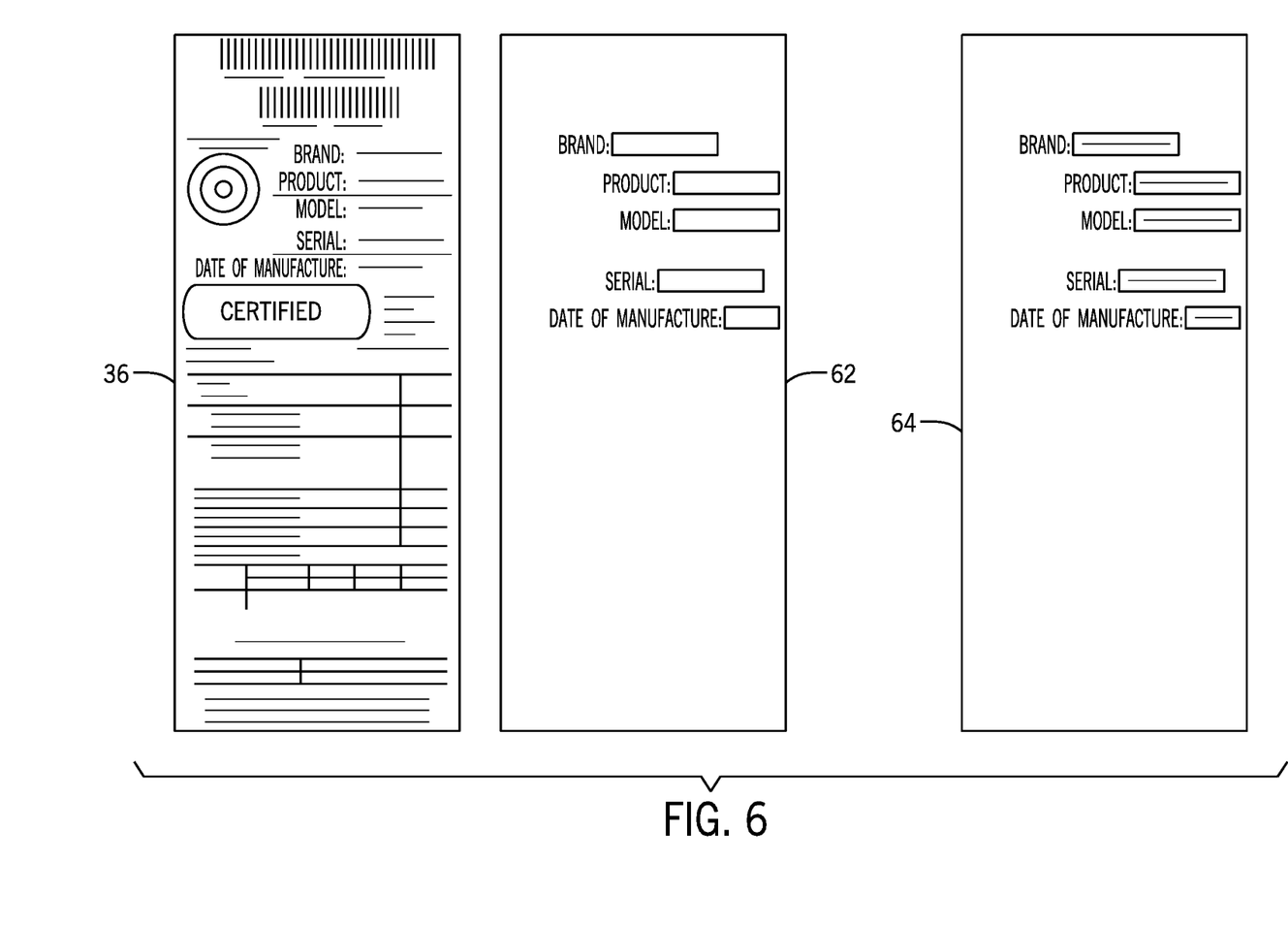
FIG. 6 illustrates schematically the application of a template mask to a processed virtual asset tag.

Advantageously, applying the overlay to the processed image (step 60) reduces the noise the OCR process is subject to, improving the process's results. As shown in FIG. 6, the processed virtual asset tag 36 is subject to an overlay template 62 that the mask all but the desired information, which in this case is the brand name, the product number, the model number, the serial number, and the date of manufacture. The masked image 64 then can be processed via OCR, to extract that desired information. (Step 66.) As one advantage, if the wrong overlay is selected, it is highly improbable that the OCR step will locate text. In the described method, knowing that text was not found can be helpful. That is, a new data point is created, which can be used to determine if a new equipment plate design has been implemented, for example. Or it can be used to improve the recognition of a particular manufacturer's equipment plate.

Figure 7:
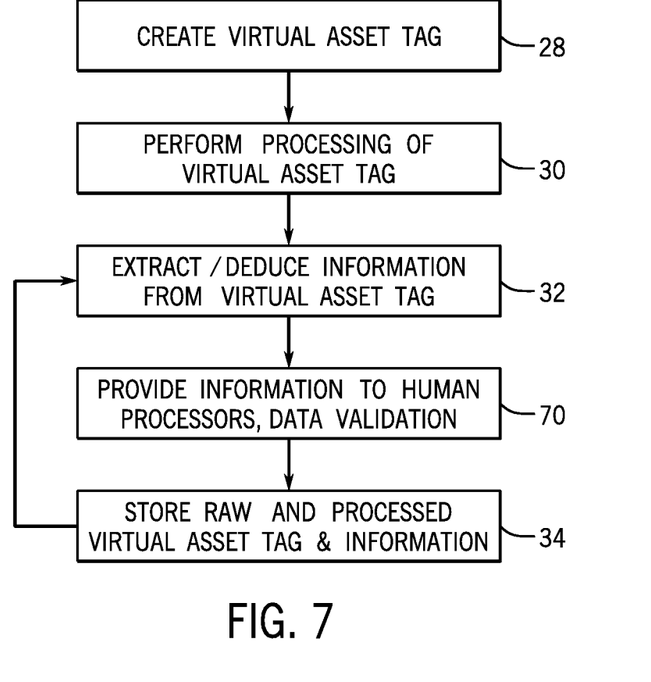
FIG. 7 is a flow chart for another method of creating and processing a virtual asset tag, in accordance with an embodiment of the present disclosure.

In accordance with another embodiment, human processors can be added into the method. For example, after the image has been transformed or masked, it can be run through some basic OCR processing. However, if the extracted information does not match the deduced manufacturer's numbering convention, that processed image can be flagged for human intervention. And this human intervention can be done by a person separate from the technician who is focused on data entry and not repair. (See FIG. 7.) Or, in an alternative embodiment, the processed image could appear on the technician's device coupled with a query asking the technician to confirm or correct the extracted data. These exemplary methods are illustrated as step 70. Indeed, the validated data can be stored and used as a feedback loop or high-certainty data points that can be mined by artificial intelligence to improve the system's overall performance.

Data validation may also be performed by multiple human processors. For example, the extracted information or processed images may be reviewed by an on-demand workforce that can review and process data remotely. That is, the on-demand workforce—such as the MTurks available from Amazon.com—can be assigned images and data to review for accuracy. The on-demand workforce can also be used to validate data extracted in an automated fashion, and can also be used to data validate one another. That is, the same image may be provided to multiple members of the on-demand force, with the system accepting validation only if the majority of those providing the validation reach consensus. Advantageously, pre-processed images, like those that have been masked or transformed to an orthogonal view from a perspective view—can improve the performance of the on-demand workforce.

Overtime, as more and more data is collected and validated, the system can generate a large amount of centralized, accurate data, from which overall knowledge about the climate-control devices at various properties can be determined. For example, maintenance schedules, replacement actions, and extended services contracts can be efficiently performed based on mining and interpretation of the centralized data.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for processing information regarding a climate-control device, comprising:
   generating a raw virtual asset tag of the climate-control device containing human-readable information;
   processing the raw virtual asset tag to create a processed virtual asset tag with an improved ability to extract information from the human-readable information;
   extracting information about the climate-control device from the processed virtual asset tag; and
   storing the raw virtual asset tag, the processed virtual asset tag, and the extracted information for future comparison with and reference for other virtual asset tags,
   wherein extracting information about the climate-control device comprises:
      comparing the processed virtual asset tag with information in a database;
      selecting an overlay mask from the database based on the comparison;
      applying the selected overlay mask to the processed virtual asset tag; and
      extracting information not masked by the overlay mask.

2. The method of claim 1, wherein generating the raw virtual asset tag comprises generating an image of the climate-control device.

3. The method of claim 2, wherein generating the raw virtual asset tag comprises generating an image of an equipment plate affixed to the climate-control device.

4. The method of claim 3, wherein processing the raw virtual asset tag comprises automatically detecting the equipment plate in the image, duplicating the image, extracting the equipment plate portion from the duplicated image, and transforming the extracted equipment plate portion to an orthogonal view.

5. The method of claim 1, comprising servicing the climate-control device based on the extracted information.

6. The method of claim 1, wherein processing the raw virtual asset tag comprises an edge mapping, wherein the edge mapping comprises:
retaining a pixel of the raw virtual asset tag having an edge gradient above a predetermined max-threshold;
discarding a pixel of the raw virtual asset tag having an edge gradient below a predetermined min-threshold; and
retaining a pixel of the raw virtual asset tag having an edge gradient between the predetermined min-threshold and the predetermined max-threshold only if the pixel is disposed adjacent to a pixel that has been retained.

7. A system for maintaining a climate-control device, comprising:
a data processing center configured to receive a raw virtual asset tag regarding a climate-control device, process the raw virtual asset tag to create a processed virtual asset tag with an improved ability to extract information about the climate-control device, extract information about the climate-control device from the processed virtual asset tag, and store the raw virtual asset tag, the processed virtual asset tag, and the extracted information for future comparison with and reference for other virtual asset tags,
wherein the information about the climate-control device is extracted from the processed virtual asset tag by:
comparing the processed virtual asset tag with information in a database;
selecting an overlay mask from the database based on the comparison;
applying the selected overlay mask to the processed virtual asset tag; and
extracting information not masked by the overlay mask.

8. The system of claim 7, wherein processing the raw virtual asset tag comprises an edge mapping, wherein the edge mapping comprises:
retaining a pixel of the raw virtual asset tag having an edge gradient above a predetermined max-threshold;
discarding a pixel of the raw virtual asset tag having an edge gradient below a predetermined min-threshold; and
retaining a pixel of the raw virtual asset tag having an edge gradient between the predetermined min-threshold and the predetermined max-threshold only if the pixel is disposed adjacent to a pixel that has been retained.

9. A method for processing information regarding a climate-control device, comprising:
capturing an image of the climate-control device;
generating a raw virtual asset tag of the climate-control device based on the image of the climate-control device without using a machine-readable code within the image of the climate-control device;
processing the raw virtual asset tag to create a processed virtual asset tag with an improved ability to extract information about the climate-control device;
extracting information about the climate-control device from the processed virtual asset tag; and
storing the raw virtual asset tag, the processed virtual asset tag, and the extracted information for future comparison with and reference for other virtual asset tags,
wherein extracting information about the climate-control device comprises:
comparing the processed virtual asset tag with information in a database;
selecting an overlay mask from the database based on the comparison;
applying the selected overlay mask to the processed virtual asset tag; and
extracting information not masked by the overlay mask.

10. The method of claim 9, wherein generating the raw virtual asset tag comprises generating the raw virtual asset tag based on the shape of the climate-control device.

11. The method of claim 9, wherein capturing the image of the climate-control device comprises capturing an image of an equipment plate on the climate-control device and wherein generating a raw virtual asset tag further comprises generating the raw virtual asset tag based on the image of equipment plate.

12. The method of claim 11, wherein extracting information about the climate-control device from the processed virtual asset tag comprises using optical character recognition (OCR).

13. The method of claim 9, wherein processing the raw virtual asset tag comprises an edge mapping, wherein the edge mapping comprises:
retaining a pixel of the raw virtual asset tag having an edge gradient above a predetermined max-threshold;
discarding a pixel of the raw virtual asset tag having an edge gradient below a predetermined min-threshold; and
retaining a pixel of the raw virtual asset tag having an edge gradient between the predetermined min-threshold and the predetermined max-threshold only if the pixel is disposed adjacent to a pixel that has been retained.

* * * * *